United States Patent
Clareti Pereira et al.

(10) Patent No.: US 8,470,272 B2
(45) Date of Patent: Jun. 25, 2013

(54) MAGNESIUM RECYCLING AND SULPHUR RECOVERY IN LEACHING OF LATERITIC NICKEL ORES

(75) Inventors: Antonio Clareti Pereira, Belo Horizonte (BR); Felipe Hilario Guimaraes, Centrom Sao Jose de Lapa (BR); Joao Alberto de Lessa Tude, Salvador (BR); Lino Rodrigues de Freitas, Lagoa Santa (BR); Tiago Valentim Berni, Belo Horizonte (BR)

(73) Assignee: Vale S.A., Rio de Janeiro (BR)

( * ) Notice: Subject to any disclaimer, the term of this patent is extended or adjusted under 35 U.S.C. 154(b) by 0 days.

(21) Appl. No.: 12/475,727

(22) Filed: Jun. 1, 2009

(65) Prior Publication Data
US 2011/0110832 A1    May 12, 2011

Related U.S. Application Data

(60) Provisional application No. 61/057,920, filed on Jun. 2, 2008.

(51) Int. Cl.
*C01F 1/00* (2006.01)
(52) U.S. Cl.
USPC ........ 423/155; 423/138; 423/157.3; 423/158; 423/159; 423/161; 423/166

(58) Field of Classification Search
USPC ............... 423/49, 138, 155, 157.3, 158, 159, 423/161, 166
See application file for complete search history.

(56) References Cited

U.S. PATENT DOCUMENTS

| 3,466,144 | A | | 9/1969 | Kay ................................ 23/183 |
| 6,053,327 | A | * | 4/2000 | Cardini et al. .................... 209/3 |
| 7,416,711 | B2 | * | 8/2008 | Liu et al. ........................ 423/140 |

FOREIGN PATENT DOCUMENTS

| FR | 2448577 | 1/1980 |
| WO | WO 2007035978 | 4/2007 |
| WO | WO 2007070973 | 6/2007 |

* cited by examiner

*Primary Examiner* — Melissa Stalder
(74) *Attorney, Agent, or Firm* — Arent Fox LLP

(57) ABSTRACT

The present invention resides in a process of recovering nickel and cobalt, regenerating the main raw materials, said process including the steps of: granulometric separation; leaching; neutralization; MHP production in only one stage and the pressure crystallization of magnesium sulphite.

The process proposes a way to recovery nickel and cobalt from laterite ores through the atmospheric and heap leaching with staged addition of ore—by size separation—and $H_2SO_4$, decreasing the nickel losses and simplifying the neutralization circuit and producing a more purified MHP.

The present process route is employed for nickel extraction, including the one from high magnesium containing lateritic ores.

22 Claims, 3 Drawing Sheets

MAGNESIUM RECYCLING AND SULPHUR RECOVERY IN LEACHING OF LATERITIC NICKEL ORES

RELATED APPLICATION

This application claims priority from U.S. provisional application Ser. No. 61/057,920, which was filed on Jun. 2, 2008.

TECHNICAL FIELD

Present process routes employed for nickel extraction from high magnesium containing lateritic ores make use of sulfuric acid as leaching agent.

BACKGROUND OF THE INVENTION

The current process routes of existing hydrometallurgical for recovering base metals such as nickel, cobalt and copper, have drawbacks such as the dependence on a source of limestone near the plant, (mining, transport and limestone milling), high investment and operating costs, logistics issues for the delivery of reagents and raw materials, high water consumption, of nickel and cobalt in steps of neutralization and the need for disposal of large quantities of liquid. Currently other drawbacks that can be cited are:

Material re-working—This re-work is generated by the attempt of avoiding nickel loss during mixed hydroxide product (MHP) and neutralization step, because these operations are carried out in two stages.

Operational difficulties caused by the current techniques employed—The current options employed to make the dissolution control of iron concentrate in the technology high pressure acid leach (HPAL) (which has also high investment costs) uses selective mining and litotype segregation;

Another problem found in cases that would be soluble magnesium is serious environmental problems due to the build up of impurities in the water case and the need to dispose of effluent in water bodies, As is known, the HPAL technology solves in a positive manner the acid consumption and iron dissolved when this technique is used in limonite ores. Moreover, operating in extremely critical conditions of pressure and temperature (275° C.) requiring special construction materials. The HPAL is only a technical solution to limonite ores (high iron content) for fine ores, for controlling the abrasion, and then applied only to ores where it is possible to perform the enrichment of the interest metal after the step of processing the material or application of the milling process costly and not solve the problem of acid recovery in saprolite ores.

Usually, the nickel loss in the neutralization is resolved by performing this step in two stages, with in the second stage the solid precipitate is recycled to the leaching step so as not to have a high nickel loss of. On the MHP step, is made in two stages to, in the first stage have a better quality of final product that can not be contaminated with manganese and magnesium. In the second stage, the MHP contaminated is recycled to reduce the nickel losses in the process.

The use of lime for the neutralization step is an option of low cost and acceptable performance when used in systems that have pH below 1.5. Above this pH there is a considerable nickel loss due to the low reactivity of the limestone. For this reason, the process requires a second stage of neutralization with the recycle of the solid to the stage of leaching. The waste generated by the limestone use as a neutralizing creates 50% more quantity of waste than in for example the use of MgO or other products that generate products of neutralizing soluble in water.

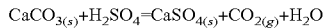

$CaCO_{3(s)} + H_2SO_4 = CaSO_{4(s)} + CO_{2(g)} + H_2O$

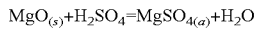

$MgO_{(s)} + H_2SO_4 = MgSO_{4(a)} + H_2O$

The impurities found in the MHP are MgO not due to reacted and manganese hydrolyzed. The MgO precipitate is due to low kinetics of the reaction between MgO and nickel sulphate and manganese is due to oxidation of $Mn^{+2}$ to $Mn^{+4}$. In normal procedures, so that there is an increase of product quality, there will be the production of MHP in two stages, where the second step returns the product to precipitate from the leaching step.

Present process routes employed for nickel extraction from high magnesium containing lateritic ores make use of sulfuric acid as leaching agent. As a result, most metals contained in the ore are co-solubilized as metal sulfates.

In such processes, it is mandatory to increase pH after leaching and thus neutralize the slurry in order to remove impurities that are also solubilized during leaching, such neutralization being normally done with limestone or milk of lime. During neutralization, iron, copper, aluminum and chrome are precipitated as hydroxides. After neutralization, it is necessary to wash such hydroxide precipitates and separate them from the leach solution, which is normally done by a series of counter-current thickeners (CCD). The overflow from the final CCD is the pregnant leach liquor containing the valuable metals nickel and cobalt.

The following operation, nickel and cobalt precipitation is normally completed by adjusting the pH of the pregnant solution by means of addition of magnesium oxide (MgO). As a result, the so-called mixed nickel-cobalt hydroxide precipitate (MHP) is formed, which, in addition to nickel and cobalt, also contains residual amounts of impurities solubilized in the leaching step. Solid MHP is then forwarded to downstream process steps to produce commercial products.

Use of limestone and milk of lime in the first neutralization step has the drawback of generation of large quantities of sulfates and hydroxides in which considerable amounts of nickel and cobalt are absorbed and trapped. Further disadvantages of use of such neutralization agents are:

Difficulties in assuring reliable sources of lime/limestone near the hydro metallurgical plant;

Need of transportation of large quantities of such neutralizing agents to the plant;

Generation of large amounts of solid effluents, mainly calcium sulfate (gypsum);

Operational problems associated with filtering, washing of gypsum, as well as gypsum disposal in tailings dams;

Formation of large quantities of magnesium sulfate containing liquid effluent.

Large consumptions of neutralization agent required when treating ore with elevated concentrations of impurities.

Conducting a search of the state of the art, there are some technological proposals to resolve the problems mentioned above.

The document U.S. Pat. No. 3,466,144 proposes a process route to obtain nickel and cobalt by an acid leach with the following characteristics:

Pressure acid leaching process or a sulphatation to solubilize nickel and cobalt, together with other impurities. In the stage of leaching the ore size is 400 tyler mesh.

Precipitation of impurities at pH 4 using the MgO from the process, followed by a solid liquid separation to remove iron, aluminum and other impurities.

Step-wise production of MHP by the use of MgO generated in the process. In this step the pH of the solution is at least 7 and advantageosly 8.

Crystallization of magnesium sulphate solution using a crystallizer under pressure (called in the document "non evaporative") for the crystallization of magnesium sulphate.

The crystals of magnesium sulphate are directed to the stage of thermal decomposition, where with the preferential use of sulfur, is held the stage of reduction of magnesium sulphate is generating the MgO and $SO_2$ gas. Natural sulfur, pyrite and other minerals and basic compounds of sulfur can be used as reducing agent.

The MgO generated in this step is returned to the process in the operations of neutralization and production of MHP. The $SO_2$ gas is routed to a sulfuric acid plant for the regeneration of the acid which returns to the process.

The patent described above requires the reduction of the entire feed stream below a tyler mesh of 400 which would considerably increase the ore treatment required prior to pressure acid leaching or sulphatation. The use of a high pressure vessel is also required for leaching in this process which would increase the equipment costs for this process.

In this patent, there is no mention of Mn removal, which would be required to ensure that the final product is within specifications especially when treating ores containing elevated Mn contents.

The document WO 2007/035978 proposes a process route for nickel and cobalt recovery which uses heap or atmospheric leaching with sulfuric acid as a leaching agent. A technique that uses the principle of separation of ore lithotypes saprolite and limonite which would utilize the neutralizing properties of the saprolite to reduce the free acid in the neutralization step and reduce the neutralizing reagent consumption was also mentioned.

In the neutralization stage for precipitation of impurities (Fe—Al precipitation) and the stage for the recovery of nickel and cobalt by the generation of MSP (Mixed Sulfide Precipitate), MHP, by solvent extraction or ion exchange, it was stated that preferably magnesium oxide (with options to use magnesium carbonate or magnesium hydroxide) be utilized. In the next stage of the process, the same compound of magnesium, which was regenerated from the process, is used for removal of manganese, with the aid of an oxidizing agent for the total removal of manganese ions in solution.

After the step of removing manganese, it is cited that the crystallization of magnesium sulphate from the solution can be carried out by evaporation. Alternatives to the evaporation crystallization route mentioned in this document were the use of a membrane system, which would utilize the principle of reverse osmosis or the precipitation using a strong alkali (for example caustic soda, soda ash or calcium oxide). After obtaining the magnesium sulphate in solid form, the magnesium sulphate would be transferred to a stage of calcination in order to decompose the magnesium sulphate crystals resulting in the generation of magnesium oxide (with the option to generate magnesium carbonate) and $SO_2$ gas. The $SO_2$ gas would then be sent to an acid plant and be converted to sulphuric acid. The magnesium oxide or magnesium carbonate would return to the process stages of precipitation of iron and aluminum, nickel and cobalt recovery and precipitation of manganese as was previously stated in U.S. Pat. No. 3,466, 144.

Potential disadvantages of this process include the use of evaporative crystallization due to the high energy consumption usually related to the evaporation of water, the dependence on solution concentration and potential impact of the water balance. Calcination of the magnesium sulphate would require high temperatures to decompose the magnesium sulphate in to MgO and $SO_2$ gas, resulting in additional energy requirements for the process.

This document also cites the use of the technique of resin in pulp for recovery of nickel and cobalt using the same principles for the precipitation of iron, aluminum and manganese along with the stage of recovery of magnesium before mentioned.

The disadvantages of this process include the use of a single leaching option to treat all size fractions and types of ore which would result in further ore treatment prior to the leaching stages.

The document WO 2007/070973 proposes a procedure for the recovery of nickel and cobalt through the recovery of magnesium oxide and regeneration of sulfuric acid which are the main inputs to process. This proposed route process has the following characteristics:

Atmospheric sulfuric leaching or heap leaching for the solubilization of nickel and cobalt;

Recovery of nickel and cobalt by precipitation of MHP using MgO generated in the process;

Precipitation of manganese using MgO generated in the process and use of kelp, lime, sodium hydroxide etc.

Recovery of crystals of magnesium sulfate preferably by the technique of common ion, where sulfuric acid is added to the effluent containing magnesium sulfate, to precipitate it.

Crystallization of magnesium sulphate was completed in two steps: initial concentration of the effluent by evaporation in ponds, then the effluent is routed to the stage of crystallization using common ion effect;

After the step of obtaining crystals of magnesium sulphate, they are going to step in reducing sulfur and preferably using a reducing agent. The document mentions the possibility of using coal and oil as reducing agents for magnesium sulphate;

The $SO_2$ gas generated during the reduction stage is directed to a sulfuric acid plant, while the MgO produced in the process is returned to the stages of precipitation of iron and aluminum, the recovery of nickel and cobalt (MHP), and the precipitation of manganese.

The process described in the document is when working with high concentrations of magnesium sulphate in the process of effluent. This can be illustrated with the following chemical equation: $2\ MgSO_4+S°\rightarrow MgO+3\ SO_2$. This equation represents the reaction of the reduction process described in document WO 2007/070973. It is required to have 2 moles of sulfur present in the magnesium sulphate and additionally 1 mol of sulfur (reagent for the reduction of magnesium sulphate) to generate the MgO and $SO_2$ that can return to the process. The sulfur added at the stage of reduction is lost during the process, or it is necessary to purge the effluent to reduce the amount of sulfate ions in solution.

The technique proposed for crystallization the common ion does not cite the need for a step to remove sulfuric acid that is co-precipitated with crystals of magnesium sulphate. Experiments show that about 5% by weight of magnesium sulphate crystals formed by this technique are composed of co-precipitated sulfuric acid.

The document FR 2,448,577, proposes a process for recovering nickel and cobalt through the following features:

Use the technique of pressure leaching using sulfuric acid sulfuric regenerated in the process;

Precipitation of impurities such as iron and aluminum through the use of MgO generated in the process;

Production of MSP containing nickel, cobalt and zinc;

Production of MSP is achieved by injection of $H_2S$ in a pressurized reactor;

Evaporation of effluent from the generation of MSP, containing essentially magnesium sulphate. The evaporation is conducted under vacuum for the generation of crystals of $MgSO_4.7H_2O$ (magnesium sulfate heptahydrate);

Heating the crystals of magnesium sulphate in a furnace at 180° C. to perform the dehydration and consequently obtaining crystals of anhydrous magnesium sulphate;

Reduction of anhydrous magnesium sulphate crystals using hydrogen gas as reducing agent. The reaction of reduction generates the $SO_2$ gas that is routed to a sulfuric acid plant and MgO;

The MgO produced is returned to the process for precipitation of impurities in the neutralization step. The MgO produced in excess is directed to a unit of agglomeration and briquetting later to be sold or stockpiled.

A new process route is disclosed here for treating lateritic ores, especially those with elevated levels of acid-consuming impurities such as iron and magnesium. The main feature of the process is magnesium recycling and sulfur recovery in hydrometallurgical processes such as those for nickel and cobalt. For that to be accomplished, magnesium sulfate contained in pregnant leach liquors is converted to magnesium oxide and recycled back to the process in such a way that it replaces limestone/lime used in neutralization steps. In addition, magnesium oxide is also utilized for MHP generation. As a result, the above cited disadvantages of using limestone/lime in neutralization operations are avoided. Any surplus of magnesium oxide is sold as a valuable product. Furthermore, in the process here disclosed sulfuric acid is regenerated by means of magnesium sulfate crystallization, reduction to magnesium oxide and gaseous sulfur dioxide ($SO_2$), which is forwarded to a sulfuric acid plant and recycled back to the leaching steps.

SUMMARY OF THE INVENTION

This present invention relates to a process for the recovery of nickel and cobalt from laterite ores and regenerating of the neutralizing agent, MgO and the sulphuric acid. Although, the present invention refers to a hydrometallurgical process to recover primary nickel and cobalt, it may also be applied for recovery of other base metals from lateritic ores.

In the traditional hydrometallurgical flowsheets of recovering nickel and cobalt, atmospheric leaching, heap leaching, or pressure leaching is applied that suggest using sulphuric acid as leaching agent, to preferably solubilize the nickel and cobalt as sulphates in an aqueous solution. However, it appears that major periods of residence, together with large quantities of sulfuric acid are required to achieve economic recovery to bring the metallurgical process routes proposed. The high consumption of sulfuric acid due to the high levels of impurities such as iron and magnesium and physicochemical properties of the material to be leached.

There is also the removing impurities step, neutralization stage, is held in two stages: in the first that occurs at pH between 2 and 3 for the preferential removal of iron and aluminum, followed by a solid-liquid separation and followed by a second stage that returns to the precipitate phase of leaching, in order to reduce the losses of nickel in this phase. In addition to performing the neutralization in two stages with a solid liquid separation between them, in the neutralization cited is the possibility to form jarosite and other compounds that co-precipitated nickel in their structures, thus causing a decrease in the recovery of nickel in their process routes proposed.

It appears that, the MHP production is followed in two stages: the first for the recovery of the final product containing about 60% to 70% of all the nickel present in solution, contaminated by manganese and magnesium oxide did not react to this stage. In the second step, the rest being precipitates of nickel, with manganese contamination of which returns to the leaching stage to be re-solubilized and re-processed within the process flow.

In the traditional flowsheets of hydrometallurgical process for nickel and cobalt recovering, there will be the removal of magnesium sulphate in the solution by precipitation by using lime (CaO) to increase of pH in the solution. The magnesium is precipitated by the hydrolysis principle, turning into hydroxide, which is then sent to tailings pond.

The applicants have found that the unit operations of leaching, neutralization, MHP production, manganese removal and magnesium sulphate reduction can be made differently from the current cases cited earlier, higher value added technical and economical route for the proposed process to be described below.

Accordingly, the present invention resides in a process of recovering nickel and cobalt, regenerating the main raw materials, said process including the steps of:

Separation—granulometric separation is done in a way that materials greater than 0.5 mm are guided to heap leaching and materials lower than 0.5 mm are guided to atmospheric leaching. This option increase the metallurgical recovery of the resources;

Leaching—In the atmospheric leaching stage, there is low $H_2SO_4$ consumption through the addition of minerals in separate stages, according with the granulometric size and use of reductant agent (such as iron and nickel metallic, magnesium or sodium sulphite and others) as a reducing agent. Some process use the ore separation by litotypes (saprolite and limonite) or another atmospheric leaching process while the process claimed in this application suggests that the high efficiency of leaching is the use of combination between the area of the particle and the amount of acid required for the solubilization of metals. For this reason we use the atmospheric leaching conducting a size separation of the ore.

Neutralization—addition of MgO in two stages to reduce the nickel loss to less than 2%:
 (a) 20% MgO pulp addition to achieve pH of 2.2 and
 (b) 2% MgO pulp addition to raise the pH until 4.5;

The neutralization stage is done in one step and using MgO pulp in different concentrations to prevent the formation of compounds that co-precipitate nickel and avoiding the reprocessing of the material.

MHP production in only one stage, with a subsequent purification using a diluted $H_2SO_4$ solution to remove the co-precipitate manganese and magnesium. This option avoids the re-processing of the product and also allows the generation of a product (MHP) free of impurities MgO and manganese and increase the amount of nickel and cobalt present on the final product;

Pressure crystallization of magnesium sulphate, and/or using evaporation and common ion techniques as complementary techniques;

Natural gas or coal can be used in the process, decreasing the process purge;

Use of alternative materials to obtain sulphur, such as residual gypsum;

Ozone gas can be used to remove manganese;

The pressure crystallization has lower consumption of energy compared to other options available for the recovery of solid magnesium sulphate;

Lower concentration of elements at the reduction reaction process, in which the Mag Sur process allows all the sulphur present in the magnesium sulphate to be converted to $SO_2$ gas;

The process described in this application performs the treatment using only the ore crushing operations, not needed by a second stage of milling to increase the recovery of the metal of interest. The increase in recovery is the joint use of heap leaching and atmospheric leaching in agitated tanks.

In the process described in this application is, in the stage of atmospheric leaching, staged dosage of ore sorted by size with a acid which takes place a sum commensurate with the material of which the largest fraction of size the relationship is between 700 to 1000 kg of acid per ton of ore, and in the smaller fraction of size is 400 to 700 kg of acid per ton of ore whereas the variable that influences the kinetics has great significance is the surface area than the separation by ore litotypes. The claimed process is based on the belief that the variable that most influences the leaching operation is the surface area of particles and not the separation of the material by lithology (saprolite-limonite ores).

The process uses MgO as a neutralizing agent by not only by reducing the amount of solid waste generated, but also by the fact suppress the dissolution of iron and magnesium in the stage of atmospheric leaching. The use of MgO allows a simplification of the logistics of obtaining supplies and reagents.

The process performs the recycle sulfur by an environmental issue and simplify the logistics of supply of raw material, and need to use alternative sources of sulfur such as waste gypsum, coal with high sulfur, pyrite.

The option of completing the process is the reduction of sulfur in the $MgSO_4$ using any type of coal (mineral, vegetable, petroleum coke primarily coal with high sulfur content in the completion of make-up of sulfur to the process. There is also the use of alternative sources such as natural gas as a reducing agent. The choice of coal mainly due by the fact to be reserves of coal occurring along the mineral occurrences of nickel.

PREFERRED EMBODIMENT OF THE INVENTION

Figure 1:
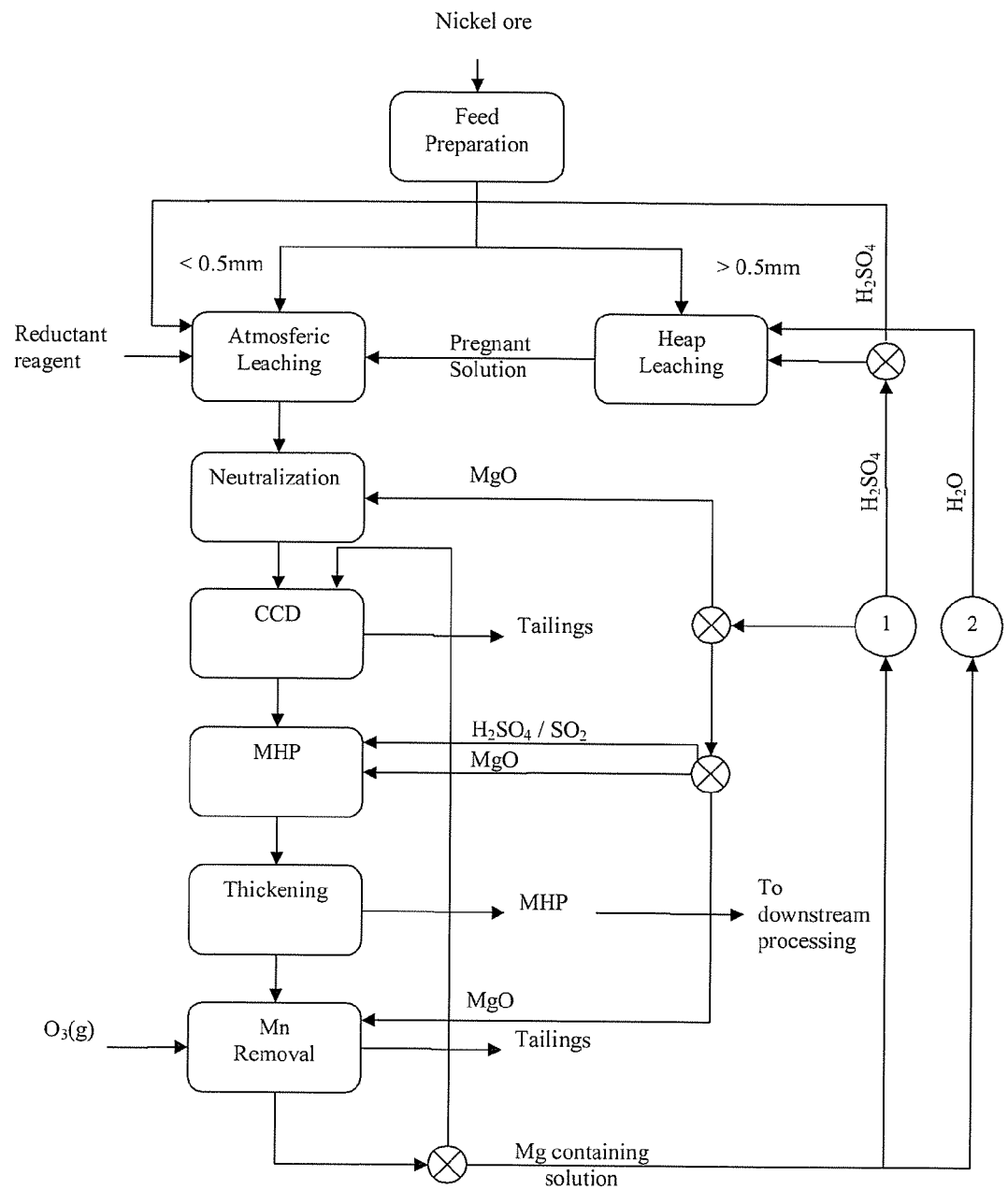
FIGS. 1 and 2 are a schematic general representations of the present process.
Figure 2:
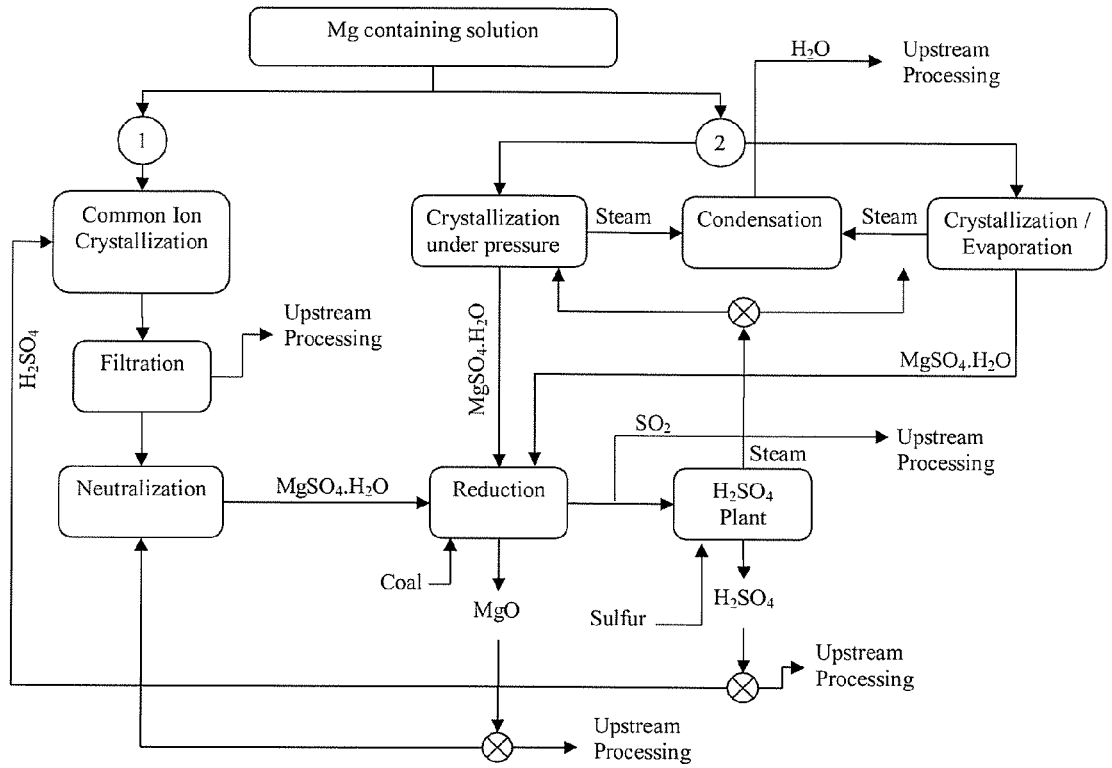
Figure 3:
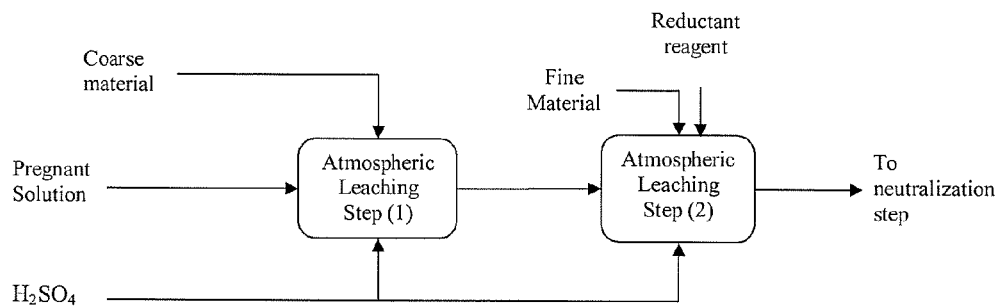
FIG. 3 is a schematic atmospheric leaching operation
Figure 4:
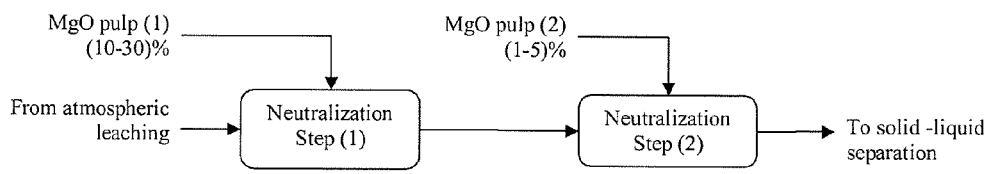
FIG. 4 is a schematic neutralization step operation
Figure 5:
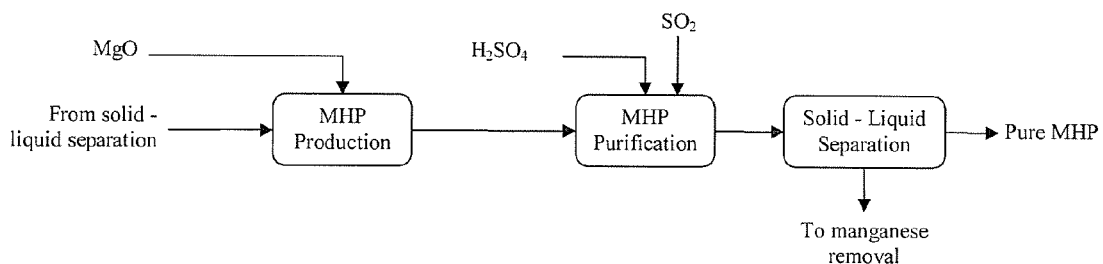
FIG. 5 is a schematic MHP production and purification

The process is applicable to recovery of base metals, such as laterite ores, nickel and cobalt from ores, concentrates and intermediates. The process includes the regeneration of acid and Mg present in the ore to form MgO which would further be used as neutralizing reagent instead of limestone and lime in the neutralization, MHP and manganese removal.

In the stage of beneficiation, the nickel containing ore, is subjected to size separation, where the coarse material (preferably high as 0.5 mm) is routed to a heap leaching step, and the fines (preferably smaller than 0.5 mm) is routed to atmospheric leaching in agitated tanks.

The heap leaching aims to recover the nickel and cobalt present in the coarse material. The leaching solution is prepared with the regenerated sulfuric acid in the process along with the water generated during pressure crystallization. The leaching solution containing sulfuric acid concentration between 50 to 300 g/L is sprinkled on the top of the heap to solubilize nickel and cobalt as sulphates. The effluent flowing out of the stack of leaching is routed to the unit of atmospheric leaching to utilize the remaining free acidity.

A particular benefit of the present invention is the use of two types of leaching (heap leaching and atmospheric in agitated tanks) for better utilization of mineral resources available in the site;

A further advantage of this present invention is to decrease the sulfuric acid consumption by adding the ore in stages according to size ranges, while also using a reducing agent from the stage of $SO_2$ reduction or another reduction reagents such as iron metallic, nickel metallic, magnesium sulphite, sodium sulphite, sodium hydrosulphite, sodium bisulphate, magnesium bisulphate to control the Eh during leaching.

On this step, the sulfuric acid leaches the nickel and cobalt as well as the impurities of iron, aluminum, manganese and magnesium in solution as sulphates. It is observed that the leaching of the ore using a size separation and a reducing agent, is better than the process cited in the state of the art, as well as increase the recovery of nickel and cobalt, leaching less impurities and the decrease sulfuric acid consumption of.

This process proposes that for better recovery of nickel and cobalt it is necessary to differentiate the leaching based on particle size of ore work in leaching atmospheric with different specific areas (separation of coarse and fine material) and not litotype separation or another method of leaching.

In the first stage of the atmospheric leaching, the ore is used mainly in size with maximum size between 0.5 mm and least 0.077 mm together adding up the effluent from the heap leaching and, if necessary, sulfuric acid to make-up. After leaching of coarse material, it is routed directly to the second stage of atmospheric leaching without conducting a solid-liquid separation. This stage is done at temperatures between 70 to 100 Celsius degrees (preferably between 95 to 100 Celsius degrees) and with a total time of 1 to 4 hours.

In the second stage, the finer material, preferably with maximum size between 0.154 mm to 0.077 mm, is added to the material from the first stage. If necessary, additional sulphuric acid is added. This stage is done at temperatures between 70 to 100 Celsius degrees (preferably between 95 to 100 Celsius degrees) and with a total residence time of 4 to 8 hours.

Following leaching, the slurry is sent to neutralization stage, where MgO pulp is added to increase the pH and to hydrolyse the iron, aluminum and copper.

One advantage of this process is propose the staged addition of the MgO pulp to reduce the loss of nickel—cobalt to less than 2% and make the neutralization without a solid-liquid separation between the two stages. In the first stage, the kinetics of iron and aluminum hydrolysis is more quickly and therefore small quantities of nickel and cobalt are lost in this internship. It is observed that at pH values above 2, the hydrolysis of iron and other impurities occurs more slowly, and therefore the addition of a neutralizing reagent in concentration too high, results in the formation of compounds that co-precipitate nickel at this stage.

This process suggests, without holding a solid-liquid separation, the addition of a neutralizing agent in two stages and, in the second stage, add a diluted pulp of MgO to be avoided the nickel and subsequent material reprocessing as some cases cited in the state of the art.

In the first stage of neutralization, a higher concentration of MgO pulp, in the range of 10-30% by weight but preferably 20% pulp is added to raise the pH value to approximately 1.5-2.5. This stage operates at temperatures between 70 to 100 Celsius degrees preferably, between 95 to 100 Celsius degrees. The material is sent to the second stage of neutralization without the solid-liquid separation.

In the second stage of neutralization, a lower concentration of MgO pulp is utilized in the range of 1-5% MgO by weight but preferably in the range of 2%, to raise the pH to the value between 4.0 and 4.5. This stage operates at temperatures between 70 to 100 Celsius degrees, preferably between 95 to 100 Celsius degrees. A solid-liquid separation step will then be utilized to separate the precipitated impurities and the pregnant solution. The pregnant solution will be sent to the nickel and cobalt precipitation stage (MHP) and the precipitated solids will be sent to a tailings disposal area.

Following neutralization and solid-liquid separation, in the MHP stage of the flowsheet, the precipitation of nickel and cobalt will be made in a single stage utilizing MgO.

MgO is added to the nickel and cobalt solution coming from the stage of neutralization to raise the pH between 7.2 to 9.0, thereby generating a precipitate containing nickel and cobalt as the main components. The temperature at this stage is kept between 40 to 80 Celsius degrees, preferably at 60 Celsius degrees. At this stage, all the nickel and cobalt are precipitated and are contaminated by MgO not react and manganese. The MHP produced on this stage is sent to MHP purification stage.

A purification stage consisting of the use of a diluted solution of $H_2SO_4$ in combination with $SO_2$ or another reducing agent such as magnesium or sodium sulphite to remove manganese and magnesium which are co-precipitated in the single stage. The H2SO4 solution is utilized in the range of 1-5% and the pH is maintained between the values from 7 to 8 preferably 7.5. The $SO_2$ gas is used to reduce the $Mn^{+4}$ to $Mn^{+2}$ and the sulfuric acid to re-dissolve the MgO co-precipitated in the stage of production of the

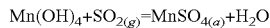
$Mn(OH)_4 + SO_{2(g)} = MnSO_{4(a)} + H_2O$

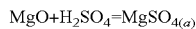
$MgO + H_2SO_4 = MgSO_{4(a)}$

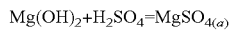
$Mg(OH)_2 + H_2SO_4 = MgSO_{4(a)}$

In this way, maximum recovery of the nickel and cobalt can be obtained in a single stage and the quality of the product can be controlled in the second stage. The resulting improvement will be the independent control of recovery and quality without the need to recycle streams back to the front of the process. This will also reduce the likelihood of additional losses in neutralization and potentially free up capacity in the front of the process for increased throughput for the similarly sized equipment.

After MHP production and purification, this process proposes a manganese removal stage using ozone gas in conjunction with MgO for the oxidation and precipitation of manganese. Alternative oxidants for manganese removal include air, $SO_2$ combined with air, or oxygen.

Following the manganese removal step, this process proposes the technique used for the recovery of $MgSO_4$ from the effluent stream is the crystallization under pressure at elevated pressure.

Through the heating of the solution under pressure at temperatures in the range of 190-240° C. but preferably at a temperature of 220 Celsius degree, the concentration of $MgSO_4$ can be reduced from 120 g/l to a concentration of 10-15 g/l magnesium sulphate, resulting in a recovery of approximately 91% of the $MgSO_4$ from solution.

The crystallized $MgSO_4$ pulp will then be directed through a solid-liquid separation stage in which the crystals will be separated and sent the reduction stage of the process. The barren liquor will be utilized in preheating of the incoming solution to the crystallizer and then flash to release the pressure. The flash gas will be condensed in a condenser while also preheating the solution entering the crystallizer.

Other optional methods for the recovery of $MgSO_4$ include crystallization by evaporation utilizing counter-current evaporation with multiple stages and/or by common ion effect common utilizing concentrate $H_2SO_4$ in high concentrates to precipitate $MgSO_4$ and complementary methods.

Following magnesium sulphate crystallization step, the crystals are sent to a furnace, where, together with coal (potentially high sulfur) or another reductor agent (such as natural gas), to carry out the reaction of reduction of magnesium sulphate to generate MgO and $SO_2$ gas.

The MgO produced in this step returns to the steps of neutralization, MHP production and manganese removal. The $SO_2$ gas is directed to a process for sulfuric acid production.

The use of natural gas and/or coal (potentially high sulfur) is used in the reduction step to provide the heat for the reduction at temperatures between 700 and 900° C. but preferably at a temperatures of 850° C. of $MgSO_4$ to MgO and $SO_2$ as well as to close the balance of mass in the sulfuric acid in the process.

Alternative sources for the make up of sulphur for the process include materials such as gypsum residue.

An opportunity inside the process is the use of rotary kilns and fluidized bed together with other reagents for the S reduction to increase the reactivity and surface area of MgO particles formed.

Example 1

Staged Ore Addition in Atmospheric Leaching

As a first example, there was a leaching of laterite nickel ore that had the following chemical analysis:

TABLE 1

| Chemical Analysis | | | | | | | | |
|---|---|---|---|---|---|---|---|---|
| Al | Ca | Co | Cr | Fe | Mg | Mn | Ni | Si |
| 1.00% | 0.06% | 0.05% | 1.49% | 39.57% | 2.21% | 0.67% | 1.11% | 10.43% |

This ore was wet sieved to size and its top was set to 32 tyler mesh. Subsequently, the ore was separated into two fractions of size one containing the first (−32#, +100#) and second (−100#). The result of the chemical analysis is:

TABLE 2

Chemical Analysis Results for (−32#, +100#)

| Al | Ca | Co | Cr | Fe | Mg | Mn | Ni | Si |
|---|---|---|---|---|---|---|---|---|
| 0.99% | 0.05% | 0.05% | 1.29% | 42.94% | 1.78% | 0.70% | 1.03% | 8.38% |

TABLE 3

Chemical Analysis Results (−100#)

| Al | Ca | Co | Cr | Fe | Mg | Mn | Ni | Si |
|---|---|---|---|---|---|---|---|---|
| 0.99% | 0.08% | 0.05% | 2.20% | 32.89% | 2.98% | 0.60% | 1.11% | 14.76% |

Ten tests were performed to evaluate the atmospheric leaching acid and control of Eh in the solution using two reducing agents: iron bar metal and magnesium sulfide.

The atmospheric leaching tests were performed in agitated tanks where the ore pulp was added initially together with sulphuric acid and remained under agitation for 1 hour. Then, after 1 hour, we add the fine ore pulp and the rest of sulfuric acid. After that, this pulp let the time required to complete 8 hours of residence time.

The reducing agent was added after 1 hour of residence time to keep the Eh value between 450-550 mV.

The tests number 9 and 10 is common atmospheric leaching without staged ore addition.

The results are displayed in the table 4:

TABLE 4

Atmospheric leaching with size separation results

| Test | Total $H_2SO_4$ Consumption (Kg $H_2SO_4$/ T ore) | $H_2SO_4$ in coarse (Kg $H_2SO_4$/ T ore) | $H_2SO_4$ in fines (Kg $H_2SO_4$/ T ore) | Reductant agent | Al (%) | Co (%) | Fe (%) | Mg (%) | Ni (%) |
|---|---|---|---|---|---|---|---|---|---|
| 1 | 400 | 700 | 231 | Iron | 8.2% | 88.3% | 35.6% | 67.6% | 82.3% |
| 2 | 500 | 700 | 375 | Iron | 7.2% | 91.2% | 37.8% | 78.3% | 86.1% |
| 3 | 400 | 900 | 89 | Iron | 8.0% | 86.3% | 32.1% | 66.2% | 83.1% |
| 4 | 500 | 900 | 251 | Iron | 7.6% | 90.2% | 35.4% | 66.3% | 87.4% |
| 5 | 400 | 700 | 213 | Mag sulphite | 7.9% | 83.2% | 41.2% | 55.4% | 71.5% |
| 6 | 500 | 700 | 375 | Mag sulphite | 7.6% | 85.7% | 44.1% | 61.2% | 77.2% |
| 7 | 400 | 900 | 89 | Mag sulphite | 7.7% | 82.1% | 40.1% | 55.1% | 72.1% |
| 8 | 500 | 900 | 251 | Mag sulphite | 7.7% | 83.6% | 41.9% | 59.8% | 76.4% |
| 9 | 400 | — | — | — | 10.2% | 65.2% | 56.3% | 72.6% | 40.2% |
| 10 | 500 | — | — | — | 11.0% | 68.2% | 64.5% | 75.4% | 45.1% |

It appears that staged the addition of mineral acid and improves the recovery of nickel and cobalt and decreases the solubilization of iron and magnesium.

It was obtained in media on the recovery 84.7% of nickel and 89.0% of cobalt using iron as reducing agent and for 74.3% of nickel and 83.7% of cobalt using magnesium sulphite as reducing agent.

The common atmospheric leaching tests is in 42.7% in nickel and 66.7% of cobalt recovery.

Example 2

Staged Neutralization

Using a PLS with a composition according to Table 5, was made neutralization test using MgO pulp in the first stage containing 20% solids to raise the pH to the value of 2.2. After the neutralization pH of the pulp to be 2.2 was added in the same reactor a MgO pulp with 2% solids to raise the pH to the value of 4.5.

TABLE 5

PLS composition utilized in neutralization tests

| Al (mg/L) | Co (mg/L) | Cu (mg/L) | Fe (mg/L) | Mg (mg/L) | Mn (mg/L) | Ni (mg/L) |
|---|---|---|---|---|---|---|
| 3460.29 | 65.24 | 133.58 | 17951.90 | 7349.00 | 276.19 | 2189.39 |

The temperature during the tests was maintained at 95 degree Celsius and stirring at 200 rpm. After finishing the test, took the step of solid-liquid separation and after the chemical analysis of solid and liquid phases were obtained by the following quantities of precipitated elements:

TABLE 6

Quantity of metal precipitated after the neutralization tests with staged addition of MgO pulp

| Al | Co | Cu | Fe | Ni |
|---|---|---|---|---|
| 62.40% | 1.32% | 74.30% | 99.80% | 2.12% |

Doing a representative test of the usual way to perform the neutralization step of the PLS liquor described by table 5, adding a pulp MgO containing 20% solids throughout the increase of pH, obtaining the following results for the metals precipitated. The results are presented in table 7:

TABLE 7

Quantity of metal precipitated after the neutralization tests with staged addition of MgO pulp

| Al | Co | Cu | Fe | Ni |
|---|---|---|---|---|
| 78.66% | 10.32% | 83.30% | 98.91% | 21.15% |

Making a comparison of the result tests presented in tables 6 and 7, there is a staged addition of the pulp of MgO reduces the nickel and cobalt losses in the neutralization stage. In the common addiction of MgO pulp we lost about 20% of nickel and 10% of cobalt in solution. When we do a staged addiction of MgO pulp (20% of solids to raise the pH to 2.2 and 2% of solids to raise the pH to 4.5) the nickel and cobalt losses reduces to 2% and 1% respectively.

Example 3

MHP Purification

After the neutralization step, we use the PLS liquor produced for the manufacture of MHP (Mixed hydroxide Precipitated). Using the PLS, MgO solid was added to liquor to raise the pH to the value of 8.2. The temperature at this stage was kept around 60 Celsius degrees. Then the sampling was done of MHP produced and it was the following chemical analysis shown in Table 8:

TABLE 8

Chemical analysis of MHP produced

| Cu | Co | Fe | Mg | Mn | Ni |
|---|---|---|---|---|---|
| 0.13% | 1.92% | 0.29% | 1.43% | 3.72% | 41.22% |

It may be noted that the MHP has produced 3.72% of manganese and 1.43% of magnesium impurities that are commonly found in current production processes of MHP.

In the same reactor that produced the MHP, began dosing in a $H_2SO_4$ solution of 2.5% (by mass) with $SO_2$ gas injection of and kept the pH around 7.5 during 2 hours. When we do a final sampling of MHP pulp and obtained the following results:

TABLE 9

Chemical analysis of more pure MHP produced

| Cu | Co | Fe | Mg | Mn | Ni |
|---|---|---|---|---|---|
| 0.15% | 1.96% | 0.31% | 0.26% | 0.5% | 44.52% |

We can check that after the experiment there was a decrease in the levels of manganese and magnesium to 0.5% and 0.26% respectively.

While in accordance with the provisions of the statute, there are illustrated and described herein specific embodiments of the invention those skilled in the art will understand that changes may be made in the form of the invention covered by the claims and that certain features of the invention may sometimes be used to advantage without a corresponding use of the other features.

What is claimed is:

1. A magnesium recycling and sulfur recovery method in leaching of lateritic nickel ores, the method comprising the steps of:
   (I) granulometric separation of coarse and fine material;
   (II) heap leaching of the coarse material and atmospheric leaching of the fine material;
   (III) neutralization of the leached material with addition of a first concentration of MgO pulp in two stages to increase the pH value up to approximately 2.5 during a first stage, and then up to approximately 4.5 during a second stage via addition of a second concentration of MgO lower than the first concentration, and to hydrolyze the iron, aluminum and copper;
   (IV) solid-liquid separation of the neutralized leached material;
   (V) purification of the separated solid with a diluted solution of $H_2SO_4$ in combination with a reducing agent;
   (VI) manganese removal from the purified separated solid using ozone gas in conjunction with MgO; and
   (VII) crystallization under pressure to promote recovery of $MgSO_4$.

2. The method according to claim 1, wherein the granulometric separation comprises guiding coarse material with a grain size greater that 0.5 mm to heap leaching, and fine materials with a grain size lower than 0.5 mm to atmospheric leaching in agitated tanks.

3. The method according to claim 1, wherein a leaching solution for heap leaching is prepared with regenerated sulphuric acid along with water generated during pressure crystallization and containing sulphuric acid concentration between 50 to 300 g/L.

4. The method according to claim 1, wherein at the atmospheric leaching stage, there is low sulphuric acid consumption according with the granulometric size and the reducing agent comprises $SO_2$.

5. The method according to claim 1, wherein the reducing agent is at least one of metallic iron, metallic nickel, magnesium sulphite, sodium sulphite, sodium hydrosulphite, sodium bisulphate, or magnesium bisulphate.

6. The method according to claim 2, wherein in the first stage of the atmospheric leaching, an ore with a maximum grain size between approximately 0.5 mm and approximately 0.077 mm is used together adding up effluent from the heap leaching and at temperatures between 70 to 100° C. and a total-time of 1 to 4 hours.

7. The method according to claim 2, wherein in the second stage of the atmospheric leaching, an ore with a maximum grain size between 0.154 mm to 0077 mm is added to the material from first stage at temperatures between 70 to 100 Celsius degree and total residence time of 4 to 8 hours.

8. The method according to claim 1, wherein the addition of the MgO pulp is made in a higher concentration in the first stage in the range of 10 to 30% by weight, and in a lower concentration in the second stage in the range of 1 to 5% MgO by weight.

9. The method according to claim 8, wherein the two stages of the neutralization occur between 70 to 100° C.

10. The method according to claim 1, wherein the pH value in the neutralization step is between 1.5 to 2.5 during the first stage and between 4.0 to 4.5 during the second stage.

11. The method according to claim 1, further comprising adding MgO subsequent to solid-liquid separation to raise the pH value between 7.2 and 9.0.

12. The method according to claim 11, wherein the solid liquid separation occurs at temperatures between 40 to 80° C.

13. The method according to claim 1, wherein in the purification stage the $H_2SO_4$ solution is utilized in the range of 1 to 5%, the pH is between 7 to 8 and the reducing agent reduces $Mn^{+4}$ to $Mn^{+2}$ and sulphuric acid redissolve the MgO co-precipitated.

14. The method according to claim 1, wherein the crystallization is carried at a temperature in the range of 190 to 240° C.

15. The method according to claim 1, wherein crystals obtained at the crystallization step are sent to a furnace and react with a reducing agent generating MgO and $SO_2$ gas.

16. The method according to claim 14, wherein the recovery of $MgSO_4$ is done using crystallization by evaporation or by common ion effect.

17. The method according to claim 6, wherein the temperatures are between 95 and 100° C.

18. The method according to claim 8, wherein the addition of the MgO pulp in the first stage is 20% MgO by weight, and in the second stage is 2% MgO by weight.

19. The method according to claim 9, wherein the two stages of the neutralization occur between 95 and 100° C.

20. The method according to claim 12, wherein the solid liquid separation occurs at a temperature of 60° C.

21. The method according to claim 13, wherein the pH is 7.5.

22. The method according to claim 14, wherein the crystallization is carried at a temperature of 220° C.

\* \* \* \* \*